Patented Mar. 29, 1932

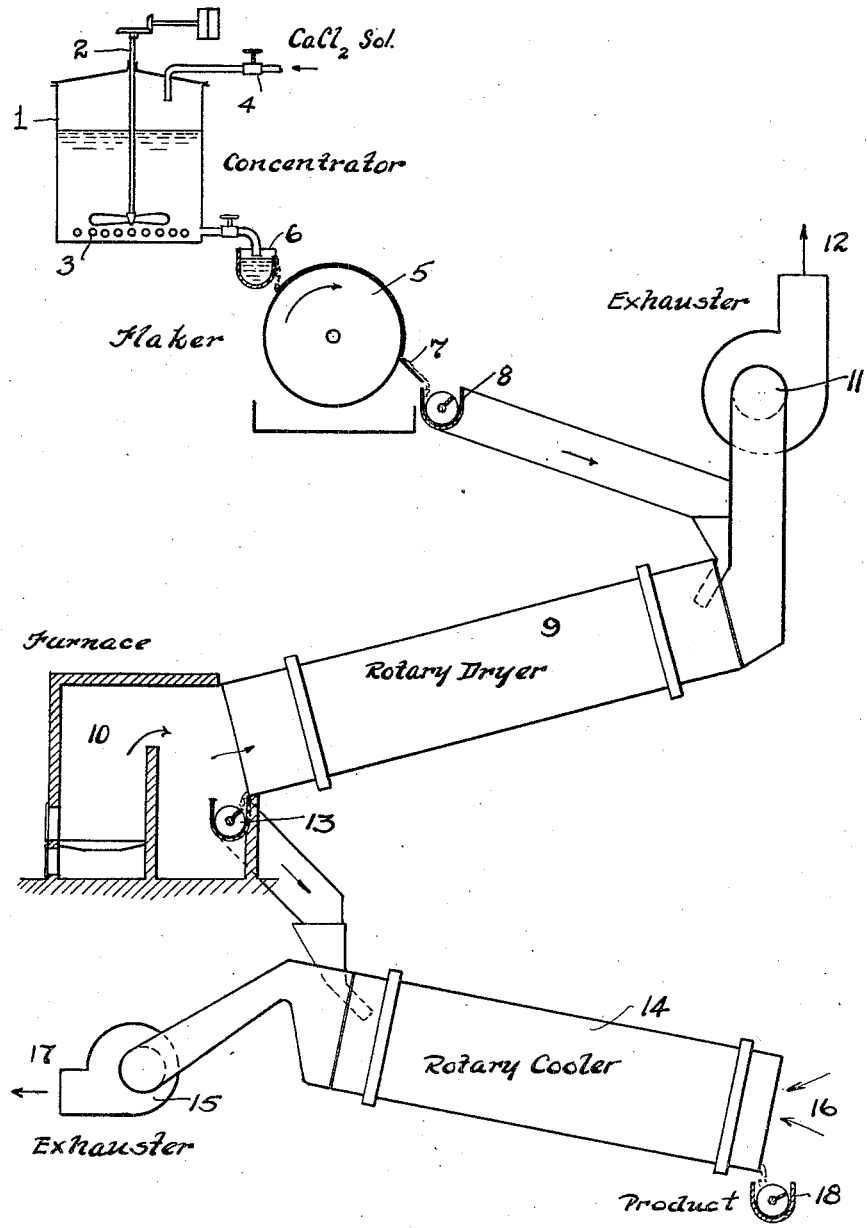

1,851,309

UNITED STATES PATENT OFFICE

SHELDON B. HEATH, OF MIDLAND, MICHIGAN, ASSIGNOR TO THE DOW CHEMICAL COMPANY, OF MIDLAND, MICHIGAN, A CORPORATION OF MICHIGAN

METHOD OF PREPARING IN PARTIALLY DEHYDRATED FORM METALLIC COMPOUNDS NORMALLY CONTAINING WATER OF CRYSTALLIZATION

Application filed March 2, 1929. Serial No. 343,961.

The invention relates to improvements in the manufacture of metallic compounds, normally containing water of crystallization, in a partially dehydrated, divided, non-coalescent form whereby the particles so obtained exhibit free-flowing characteristics and a reduced tendency to cake or solidify in the container or package.

Generally speaking, compounds of the character in hand can exist in one or more solid hydrated forms containing water of crystallization and are further characterized as being deliquescent substances readily attracting moisture from the air and dissolving easily in water. Such substances on account of their high degree of solubility do not crystallize readily from their aqueous solutions and can be crystallized then only from relatively concentrated solutions. The product so obtained consists of crystals having the surfaces thereof wetted with the concentrated mother liquor. Unless this adhering mother liquor is removed the crystals upon standing soon cake or coalesce into a more or less solid mass, often difficult to break up. For obtaining a pure crystalline product in divided form which can be stored in suitable containers or packages without caking or solidifying, it is important to separate the crystals as completely as possible from any adhering mother liquor. Washing with water accomplishes this result more or less completely, but at the expense of redissolving a considerable proportion of the crystals themselves. Ordinary drying methods in most cases cannot be used without danger of fusing the crystals together into a solid mass.

One method of processing a substance of the present character, as specifically applied to calcium chloride or magnesium chloride, is described in U. S. Patent 1,527,121 to Cottringer and Collings. Briefly described, the method consists in concentrating a solution of the salt at an elevated temperature such that upon cooling the so concentrated solution is capable of setting into a solid, or at least semi-solid, mass; causing the fused material to flow on to the periphery of a revolving drum cooled so as to chill a solidified layer of the substance upon the surface thereof; scraping the solidified layer off in the form of flakes; kiln-drying the product and then cooling in a current of air, whereby the individual flakes are superficially dried or dehydrated further to the point where their inherent tendency to coalesce is materially reduced. The product so obtained is a partially dehydrated divided or comminuted form of the normal hydrated salt.

The present invention comprises an improvement upon the above described method of working whereby a divided or comminuted product having a lower content of water of crystallization is obtained, such product possessing to an increased degree the desired free-flowing and non-caking characteristics, the particles also being harder and stronger and thereby less susceptible to crumbling or powdering when handled.

A further advantage lies in the fact that the particles may be prepared by a flaking process wherein the solidified film formed on the surface of the flaker drum is more easily and cleanly detached therefrom by the scraper knives than by the method as at present employed.

To the accomplishment of the foregoing and related ends the invention, then, consists of the steps and new products hereinafter fully described and particularly pointed out in the claims, the annexed drawing and following description setting forth certain detailed procedures embodying the invention, these being illustrative, however, of but a few of the various ways in which the principle of my invention may be applied.

In said annexed drawing:

The single figure there appearing illustrates in diagrammatic fashion an apparatus arranged for the carrying out of my improved process or method.

In general a material may be flaked in the manner already described if it can be prepared by evaporation of its solution to a fluid or semi-fluid mass of such composition that, upon cooling, complete solidification thereof will occur at a temperature materially above normal atmospheric temperature. When such fluid material is applied in a thin film to the cooled surface of a revolving flaker drum, the film solidifies so that it can be scraped off as well-defined flakes. The higher the solidification temperature thereof, the more easily and rapidly is the operation performed.

The usual practice has been to carry the preliminary evaporation of the solution to be flaked only so far as to maintain a clear liquid at the boiling temperature, and it has been thought advisable to stop the concentration short of the point where any material precipitation of solid crystals takes place. I have found, in some cases, that the solidified film formed by chilling such clear solution on a flaker drum is tough and rubbery, adhering tightly to the drum, so that it can not be easily detached, and furthermore is not sufficiently hard and brittle to break off cleanly in flakes of regular and definite form. At times and with certain materials the difficulties involved in producing a satisfactory flake product are of very material consequence.

I have now found that difficulties of the sort just mentioned may be largely avoided if the solution to be flaked contains in appreciable amount solid crystalline particles held in suspension therein. The presence of such particles in the solidified film as it is formed upon the surface of the flaker drum serves to alter or modify the character of the film, imparting to it greater hardness and brittleness and also, apparently, accelerating somewhat the rate of solidification. To obtain the requisite suspension of solid crystalline particles I carry the concentration of the solution further than has been the practice previously and, indeed, to the point where a material precipitation of crystals takes place therein, either at the temperature of evaporation or when cooled to a certain lower temperature above the solidifying point of the concentrated solution. In other words, the concentration is caused to proceed beyond the point of saturation of the dissolved constituent or of at least one of the dissolved constituents, should more than one be present, at some temperature above that at which the mass will solidify. Proceeding in this way I obtain a slurry, or magma, of precipitated crystals and hot mother liquor, the consistency of which is preferably so regulated, by controlling the amount of crystallization, that it may be conveniently pumped through pipes from the concentrating vessel to the flaking apparatus in the usual way.

Other advantages also accrue as a result of my improved method of procedure. Obviously the flake product so made contains a higher percentage by weight of the essential constituent. Another advantage is that certain products can be conveniently prepared in flake form which cannot readily be so made if it is attempted to flake a clear solution thereof. Furthermore it is frequently of advantage to concentrate under vacuum, whereby a lower final temperature suffices to give the same degree of concentration. Under such procedure, however, the solubility of the dissolved substance in the mother liquor is proportionately lowered and a greater or lesser quantity of crystals is precipitated. By making a crystal slurry in this way and flaking such slurry, instead of flaking a clear solution of equal concentration, which could be obtained only by evaporating at a higher temperature and correspondingly higher pressure, a notable economy in operation is realized. Concurrently, such procedure often results in lessened wear and tear and corrosion on the evaporating equipment, due to operating at a lower temperature.

Taking calcium chloride as an example of a product of the type herein referred to, this salt is now manufactured commercially in large quantity by concentrating a solution thereof to a content of from 71 to 75 per cent of the anhydrous salt and then flaking and drying in accordance with the patented procedure previously described. The flaked product so obtained contains somewhat less water of crystallization than corresponds to the dihydrated salt $CaCl_2.2H_2O$, corresponding to about 75 per cent. anhydrous $CaCl_2$, or slightly less.

For proceeding in accordance with the present invention, I concentrate a solution of calcium chloride to a temperature of 177° to 178° C. at atmospheric pressure, whereupon continued evaporation results in salting out crystals of calcium chloride monohydrate, $CaCl_2.H_2O$, forming a slurry thereof with the hot mother liquor, which is then flaked in the usual way. The concentrated solution exhibits a propensity to become superheated if evaporated rapidly, so that the temperature during the salting out of the monohydrate crystals may rise to as high as 186° C. if the rate of evaporation is sufficiently high. The slurry has a very sharp freezing point and will solidify at a temperature above 170° to form hard strong particles. A slurry having a consistency such that it can be pumped readily from the concentrator to the flaker will produce a flake containing about 77 per cent. anhydrous calcium chloride, which may then be superficially dried and cooled as already described.

My preferred method of procedure is indicated in the accompanying drawing in which 1 represents a concentrating kettle provided with an agitator 2 and heating coils 3. Calcium chloride solution is fed in by way of pipe 4. Concentration in this kettle is either continuous or by batches as preferred, there being formed therein a slurry of mother liquor and crystals of calcium chloride mono-hydrate $CaCl_2.H_2O$. This slurry will be preferably as thick as can be pumped to the flaker 5 and it may be either fed directly into the pan of the flaker or distributed upon the drum by means of a suitable spreading device indicated at 6. The revolving flaker drum 5 is cooled in the ordinary way and there is formed thereon a thin solidified film of the chloride which is scraped off by the knife 7 and delivered to the conveyor 8 and thence to the dryer 9 shown as of the rotary kiln type. The latter is preferably provided with internal shovels for lifting and dropping the flakes through a heated gaseous current derived from the combustion of fuel in the connected furnace 10, such heated gaseous current being drawn through the dryer by the exhauster 11 and discharged at 12. The hot superficially dried flakes are discharged from the dryer 9 to conveyor 13 which delivers them to the cooler 14, here shown as of similar construction of the dryer. A current of air is drawn through the cooler by the exhauster fan 15, in the direction as indicated by the arrows at 16 and 17. The dried and cooled flakes are discharged to the conveyor 18 to be delivered to the packaging or other further step in the treatment.

The product from the flaker so obtained contains, as previously pointed out, a higher percentage of anhydrous $CaCl_2$ than that prepared by present methods, i. e. 77 per cent. as compared with from 71 to 75 per cent. $CaCl_2$. It consists essentially of a conglomerate of crystals of the mono-hydrate, $CaCl_2.H_2O$, in a matrix of the solidified mother liquor composed substantially of the dihydrate $CaCl_2.2H_2O$. The drying operation has the effect of reducing the water content of the surfaces of the individual particles below the average for the product as originally formed. The flakes are mechanically stronger and make less dust in the drying operation and subsequent handling than the former product, and have less tendency to coalesce and cake in the package.

While I have described my invention as being particularly applicable to the preparation of a flake product, the advantages inherent in the method of treating a crystal slurry are very apparently of equal applicability to other methods of forming materials of the character described in divided, comminuted form wherein a suitable slurry is treated to produce directly discrete solid particles thereof. For example, a more or less spherical or granular divided form of product may be made by spraying the slurry from a rapidly revolving disc or by forcing it under pressure from an orifice, or by similar methods.

In the following claims, "slurry" is used to mean a fluid mixture of mother liquor and crystals in suspension therein, having a consistency such that it may be pumped or otherwise handled by means similar to those commonly employed for handling or transferring liquids.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of preparing hydrated calcium chloride containing less water of crystallization than corresponds to the formula $CaCl_2.2H_2O$, the steps which consist in concentrating a solution of calcium chloride to form a slurry composed of crystals of calcium chloride monohydrate and the mother liquor thereof and flaking said slurry.

2. In a method of preparing hydrated calcium chloride containing less water of crystallization than corresponds to the formula $CaCl_2.2H_2O$, the steps which consist in concentrating a solution of calcium chloride to form a slurry composed of crystals of calcium chloride monohydrate and the mother liquor thereof and solidifying said slurry so as to form small particles.

3. The method of prepared hydrated calcium chloride containing less water of crystallization than corresponds to the formula $CaCl_2.2H_2O$ which comprises concentrating a solution of calcium chloride by heating to a temperature between 177° and 186° C. at atmospheric pressure to form a slurry composed of crystals of calcium chloride mono-hydrate and the mother liquor thereof, solidifying said slurry so as to form small flake particles, drying such particles to remove water from the surfaces thereof and cooling the dried particles in a current of unheated air.

4. The method of preparing hydrated calcium chloride containing less water of crystallization than corresponds to the formula $CaCl_2.2H_2O$ which comprises concentrating a solution of calcium chloride by evaporation to a temperature of approximately 178° C. at atmospheric pressure, continuing evaporation until a slurry of crystals of calcium chloride mono-hydrate and mother liquor thereof is produced, solidifying such slurry in the form of small flake particles, drying such particles to remove water from the surfaces thereof and cooling the dried particles in a current of unheated air.

5. In a method of preparing hydrated calcium chloride containing less water of crystallization than corresponds to the formula $CaCl_2.2H_2O$, the step which consists in flaking a slurry of calcium chloride monohydrate crystals and the mother liquor thereof, such slurry having a $CaCl_2$ content in excess of 75 per cent.

6. The method of preparing hydrated calcium chloride containing less water of crystallization than corresponds to the formula $CaCl_2.2H_2O$ which comprises concentrating a solution of calcium chloride by heating to a temperature between 177° and 186° C. at atmospheric pressure to form a slurry composed of crystals of calcium chloride monohydrate and mother liquor thereof and flaking such slurry.

Signed by me this 25 day of February, 1929.

SHELDON B. HEATH.